(12) United States Patent
O'Connor

(10) Patent No.: US 6,798,774 B1
(45) Date of Patent: Sep. 28, 2004

(54) TRANSCODER RATE CONTROLLER

(75) Inventor: Neil O'Connor, Co. Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 779 days.

(21) Appl. No.: 09/636,578

(22) Filed: Aug. 10, 2000

(30) Foreign Application Priority Data

Aug. 11, 1999 (GB) .............................. 9918953

(51) Int. Cl.$^7$ .................. H04L 12/28; H04L 12/56
(52) U.S. Cl. ................ 370/391; 370/465; 370/521
(58) Field of Search .............................. 370/391, 352, 370/310, 328, 329, 326, 347, 389, 435, 442, 204, 212, 213, 537, 538, 401, 229, 230, 235, 468, 392, 466, 521; 455/560, 422.1, 450, 63.1; 704/500, 503

(56) References Cited

U.S. PATENT DOCUMENTS 6,125,120 A * 9/2000 Lehtimaki ................... 370/435
6,167,040 A * 12/2000 Haeggstrom ................. 370/352
6,295,302 B1 * 9/2001 Hellwig et al. .............. 370/522
6,349,197 B1 * 2/2002 Oestreich ................... 455/63.1
6,556,844 B1 * 4/2003 Mayer ........................ 455/560

FOREIGN PATENT DOCUMENTS

| GB | 2316277 | 2/1998 |
| GB | 2320166 | 6/1998 |
| WO | WO96/32823 | 10/1996 |
| WO | WO97/29566 | 8/1997 |
| WO | WO98/21840 | 5/1998 |
| WO | WO9956456 | 11/1999 |

OTHER PUBLICATIONS

International Search Report Application No. PCT/EP00/07394.

International Search Report Application No. GB 9918953.2.

* cited by examiner

Primary Examiner—Brian Nguyen

(57) ABSTRACT

A transcoder rate controller is provided which carries out tandem free operation (TFO) transcoding on inter-switching controller signals in a data transmission network.

12 Claims, 2 Drawing Sheets

TRANSCODER RATE CONTROLLER

TECHNICAL FIELD OF THE INVENTION

The present invention relates to a new transcoder rate controller for a data transmission network, in particular the GSM network, and to a new method of transmitting data between switching controllers in a data transmission network.

DESCRIPTION OF RELATED ART

Data transmission networks generally require transcoders to transcode data from one format/data rate to another format/data rate. One such data transmission network is the GSM network.

FIG. 1 of the accompanying drawings is an exemplary illustration of a standard GSM network arrangement.

As can be seen, in a GSM network arrangement a mobile station (MS) 1 is connected to a base station sub-system (BSS) 2 which provides and manages transmission paths between the mobile station (MS) and the GSM network switching sub-systems. In this case, the base station sub-system (BSS) 2 is connected to a mobile switching controller (MSC) 3. The mobile switching controller (MSC) 3 controls the routing of the signal between the mobile station (MS) 1 and another mobile switching controller (MSC) via the inter-MSC E-channel, to the Public Switched Telephone Network (PSTN) or to another base station sub-system (BSS) connected to that mobile switching controller 3 (not shown). Typically, a mobile switching controller (MSC) 3 is connected to a number of base station subsystems (BSS) 2 providing coverage for a large number of mobile stations (MS) 1.

The base station sub-system (BSS) 2 provides several different functions, which are shown in FIG. 1 as separate blocks within the base station sub-system (BSS). Firstly, a base transceiver station (BTS) 4 is provided which handles the radio communication with the mobile station (MS) 1. A base station controller (BSC) 5 controls the operation of the base transceiver station (BTS) 4. Finally, a transcoder rate controller (TRC) 6 performs GSM specific speech encoding and decoding and rate adaption for data.

The base transceiver station (BTS) 4 is connected to the base station controller (BSC) 5 by way of the A-bis channel and the base station controller (BSC) 5 is connected to the transcoder rate controller (TRC) 6 by way of the A-ter channel. The A-bis and the A-ter channel data rates are variable, and depend on the coding rate of the data received from the mobile station (MS) 1. As is well known, a number of different data rates for the speech signal received from the mobile station (MS) 1 have been specified in the GSM standard. However, the data rate is typically 4×16 k for full rate/extended full rate coded speech or is 8×8 k for half rate coded speech.

The use of Tandem-Free Operation for GSM speech has recently been standardised and is outlined in ETSI specification GSM 08.62. The use of Tandem-Free Operation (TFO) allows communication via in-band signalling between transcoders.

It is desirable to reduce the data rate of signals sent between adjacent mobile switching controllers (MSC) 3 on the E-channel to minimise costs. Previously, digital circuit multiplication equipment (DCME) has been provided to compress data on the E-interface. FIG. 2 shows a diagrammatic representation of a previous arrangement in which a digital circuit multiplication equipment (DCME) 7 is connected to the mobile switching controller (MSC) 3 to compress the E-channel data. The digital circuit multiplication equipment (DCME) 7 provides speech compression and allows a number of speech channels to be combined into one time slot. At the other end of the compressed E-channel interface a further digital circuit multiplication equipment (DCME) 8 decompresses the received compressed E-channel data and provides the decompressed E-channel data to its associated mobile switching controller (MSC). The mobile switching controller (MSC) 9 can forward the data on to the base station sub-system 10 corresponding to the mobile station 11 for which the data is intended.

SUMMARY OF THE INVENTION

The transmission saving provided by the use of digital circuit multiplication equipment (DCME) 7, 8 in previous arrangements is achieved at the expense of speech quality, thus resulting in an undesirable tradeoff between speech quality and transmission efficiency within the transmission network. Furthermore, the provision of a separate digital circuit multiplication equipment (DCME) 7, 8 within the E-channel between adjacent mobile switching controllers (MSC) 3, 9 undesirably increases the operation and maintenance requirement of the network. The increase in operational costs as a result of the maintenance requirement of the separate digital circuit multiplication equipment (DCME) can outweigh the benefit gained by using the digital circuit multiplication equipment (DCME).

The present invention therefore seeks to optimise both speech quality and transmission efficiency within a data transmission network whilst reducing the operation and maintenance overheads.

In accordance with the invention, therefore, the E channel data output from the mobile switching controller is routed through the transcoder rate controller. The use of the transcoder rate controller in accordance with the invention results in improved speech quality together with band width compression, without a significant additional operation and maintenance requirement.

BRIEF DESCRIPTION OF THE DRAWINGS

For a better understanding of the present invention, and to show how it may be bought into effect, reference will now be made, by way of example, to the accompanying drawings in which.

DETAILED DESCRIPTION OF PREFERRED EMBODIMENTS

An embodiment of the invention will now be described with reference to FIGS. 3–5.

Figure 1:
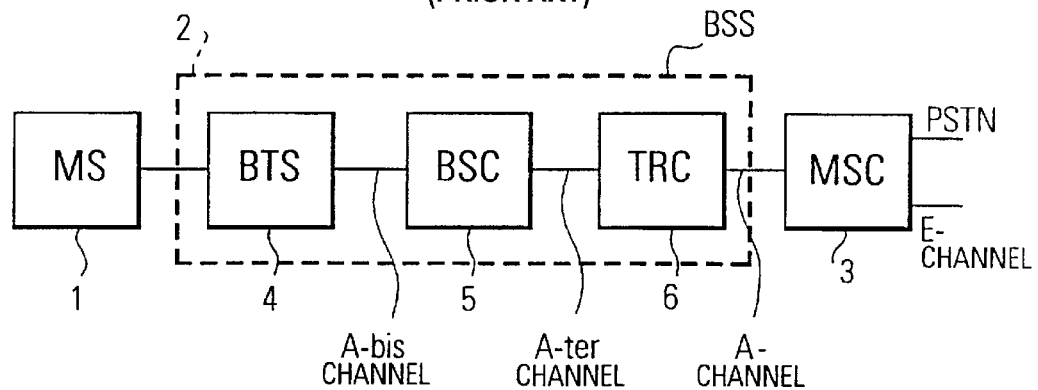
FIG. 1 shows a standard GSM network arrangement.

A transcoder rate controller 12, in accordance with the invention, replaces the previously known transcoder rate controller 6 shown in FIG. 1. Otherwise, the general outline of FIG. 3 is similar to the arrangement shown in FIG. 1, and so corresponding description will be omitted.

Figure 3:
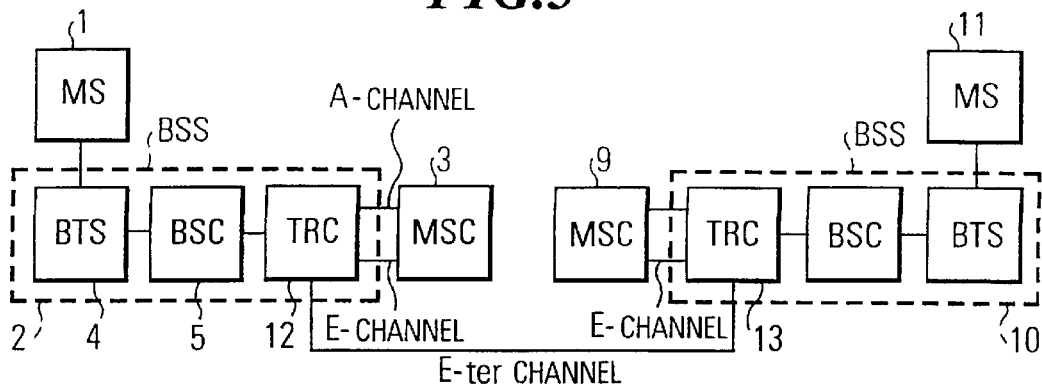
FIG. 3 shows a data transmission network arrangement in accordance with the present invention.

The transcoder rate controller (TRC) 12 of one embodiment of the present invention is shown in FIG. 3 in the base station sub-system (BSS) 2 and is coupled to the mobile switching controller (MSC) 3 by way of the A-channel in the same way as the transcoder rate controller 6 shown in FIG. 1. However, in contrast to the arrangement shown in FIG. 1, the E-channel data output from the mobile switching controller (MSC) 3 is input to the transcoder rate controller (TRC) 12 at an E-channel interface. Transcoded data is output from the transcoder rate controller (TRC) 12 on a new channel, the E-ter channel, which is connected to the E-ter channel interface of a corresponding transcoder rate controller (TRC) 13 associated with a second mobile switching controller (MSC) 9.

Figure 4:
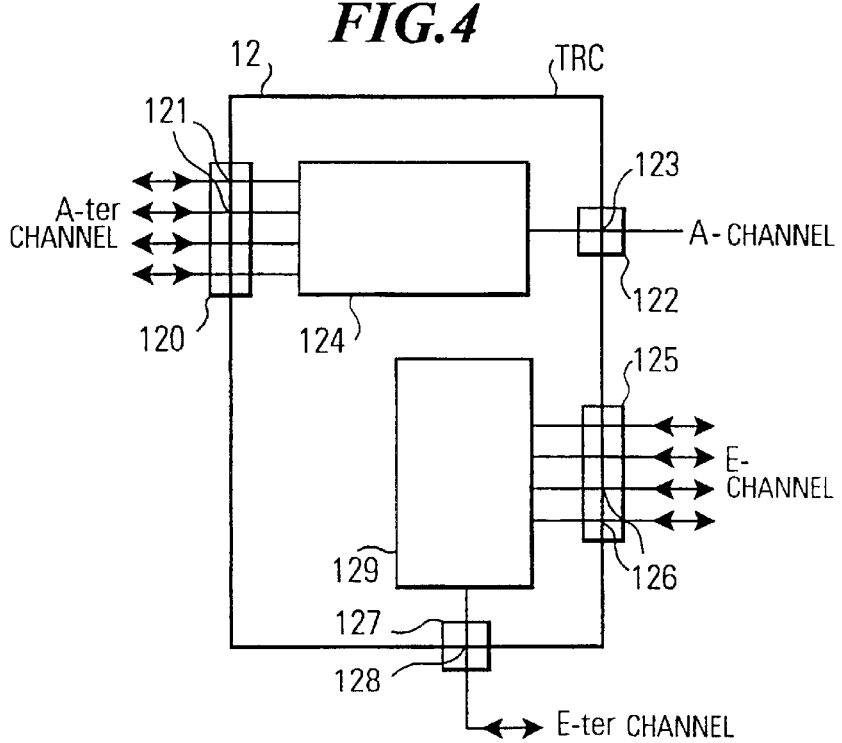
FIG. 4 shows a schematic diagram of interconnections within a first embodiment of the transcoder controller node of the present invention.

The internal arrangements of a first embodiment of the new transcoder rate controller (TRC) 12 and 13 of FIG. 3 are shown in FIG. 4.

As outlined above, the transcoder rate controller shown in FIG. 4 has an E-channel interface in addition to the A-channel interface of the known transcoder rate controller 6.

The transcoder rate controller 12 has an A-ter channel interface 120, comprising a plurality of input/output ports 121, connected to an A-channel interface 122, comprising a single input/output port 123, through an A-channel transcoder 124.

The transcoder rate controller 12 also comprises an E-channel interface 125, comprising a plurality of input/output ports 126, connected to an E-ter channel interface 127, comprising a single input/output port 128, through an E-channel transcoder 129.

The A-channel, A-ter channel, E-channel and the E-ter channel are all shown as bi-directional in FIG. 4, to make clear that transcoders 124 and 129 transcode data between the respective channels, not merely in one direction. However, for simplicity, transcoding in only one direction is described below.

Figure 5:
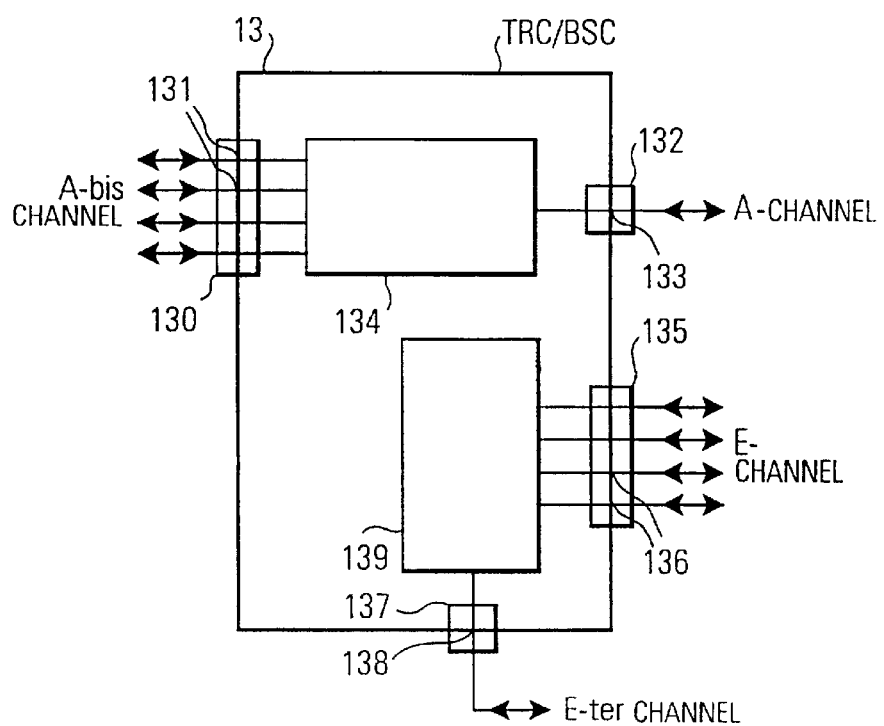
FIG. 5 shows a schematic diagram of interconnections within a combined base station controller/transcoder rate controller in accordance with a second embodiment of the present invention.
Figure 2:
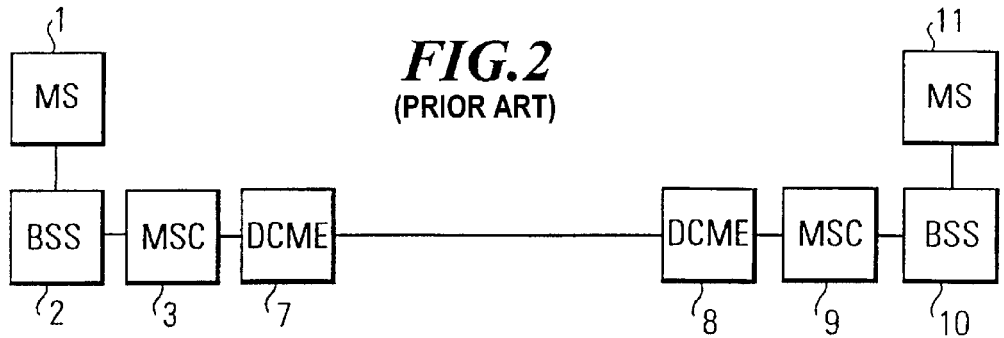
FIG. 2 shows a prior art arrangement utilising digital circuit multiplication equipment.

FIG. 5 shows a second embodiment of the invention in which the transcoder rate controller in accordance with a second embodiment of the invention is co-located with the base station controller (BSC) 5 shown in FIG. 1, forming a combined base station controller/transcoder rate controller (BSC/TRC) 13. The base station controller/transcoder rate controller (BSC/TRC) 13 has an A-bis channel interface 130 instead of the A-ter channel interface 120 shown in FIG. 4, but otherwise the input-output ports 131, A-channel interface 132, input/output port 133, A-channel transcoder 134, E-channel interface 135, input/output ports 136, E-ter channel interface 137, input/output port 138 and E-channel transcoder operate as described above with reference to the corresponding parts with references 121–129.

It will be clear to a skilled person that the transcoder rate controller of the present invention can be provided as a separate node, but in addition can be incorporated as a functional unit within the base station controller (BSC) of the base station system (BSS).

The operation of the transcoder rate controller in accordance with the invention will now be described.

The data received on the A-ter channel (as shown in FIG. 4) and on the A-bis channel (as shown in FIG. 5) is generally in the form of 4×16 k for full rate/extended full rate coded speech or 8×8 k for half rate coded speech, as indicated above.

Preferably, the A-channel transcoders 124, 134 transcode the data using a tandem free operation (TFO) function to output a 1×64 k A-channel speech signal in which the least two significant bits (for FR or EFR speech) or the least significant bit (for HR speech) of each byte contains a TFO frame and the remaining bits contain the remainder of the PCM frame. Thus the A-channel transcoders may adhere to the GSM 08.62 TFO protocol to output TFO frames and slightly degraded PCM speech data. Alternatively, the A-channel transcoders may output non-TFO PCM speech.

In addition, the transcoder rate controller (TRC) has an E-channel interface connected to the E-channel interface of the mobile switching controller (MSC), as indicated above. Each of the E-channel transcoders 129, 139 is connected to four input channels to receive data on the E-channel from the mobile switching controller (MSC).

If the data received on the E-channel from the mobile switching controller (MSC) does not contain any TFO frames, the E-channel transcoders 129, 139 transcode the received data without using the tandem free operation (TFO) to achieve compressed PCM speech data, as is known in the art.

If the data received on the E-channel from the mobile switching controller (MSC) contains TFO frames, the E-channel transcoder uses an enhanced TFO function, in accordance with the invention. Thus, when the E-channel transcoders 129, 139 receive TFO coded data on the input channels from the mobile switching controller, the E-channel transcoders 129, 139 extract the TFO information from the least significant bits of each byte of the 4×64 k received E-channel signal and output a 1×64 k channel consisting of four 16 k TFO channels as the E-ter channel data. The E-ter channel data is then output through the input/output port 128, 138 to the corresponding input/output port 128, 138 of the transcoder rate controller (TRC) of another mobile switching controller (MSC).

The enhanced TFO function E-ter data can be handled in different ways at the receiving transcoder rate controller, depending on the destination of the data.

E-ter data which is to be passed to a mobile station in contact with the mobile switching controller (MSC) associated with the receiving transcoder rate controller undergoes a reverse operation to that described above, as will be apparent to a skilled person. In this case the TFO frames are extracted from the received E-ter data and put into the LSB of data output on the E-channel to the associated mobile switching controller (MSC). The mobile switching controller (MSC) then passes the data to the relevant base station controller on the A-channel.

If the received data is to be routed to the PSTN, the TFO data received on the E-ter channel would be transcoded by the E-channel transcoders into normal PCM speech and output to the associated mobile switching controller (MSC) on the E-channel. The mobile switching controller (MSC) then passes the data to the PSTN, as is known to a skilled-person.

Although the transcoder rate controllers shown in FIGS. 4 and 5 have only four input channels combined in the transcoder to form a single output channel, it will be clear to a skilled person that other ratios between the input and output of the transcoders 124 and 129 could be possible. In addition, in practice the transcoder rate controller may contain a plurality of each of transcoders 124, 129, 134 and 139 connected to respective corresponding input/output ports.

Thus, in accordance with the invention it is possible for the TFO protocol to be maintained for inter-mobile station (MS—MS) communications, resulting in encoding and decoding being performed only in the mobile stations.

For mobile station (MS) to public switched telephone network (PSTN) calls, the transcoders of the transcoder rate controller maintain the TFO protocol over the E-ter interface and perform the transcoding only at the transcoder rate controller connected to the public switched telephone network (i.e. transcoding at the edge).

Data calls may be routed separately by the mobile switching controller (MSC) on dedicated 64 k non compressed time slots between the mobile switching controllers (MSC).

Thus in accordance with the invention considerable savings can be made in transmission costs between mobile switching centres whilst maintaining speech quality and avoiding an increase in operation and maintenance cost.

What is claimed is:

1. A transcoder rate controller having
   a first transcoder means, arranged between a first channel input/output means and a second channel input/output means, for transcoding data between the first channel input/output means and the second channel input/output means, wherein the second channel input/output means is arranged to receive or transmit data on a plurality of channels at a first data rate, and the first channel input/output means is arranged to receive or transmit data on a single channel at a second data rate higher than the first data rate; and
   a second transcoder means arranged between a third channel input/output means and a fourth channel input/output means, for transcoding data between the third channel input/output means and the fourth channel input/output means using a tandem free operation function (TFO), wherein the third channel input/output means is arranged to receive or transmit data on a plurality of channels at a third data rate, and the fourth channel input/output means is arranged to receive or transmit data on a single channel at the third data rate.

2. A transcoder rate controller, as claimed in claim 1, wherein the first transcoder means comprises a plurality of first transcoders, each first transcoder being arranged between corresponding respective first channel input/output port and second channel input/output ports.

3. A transcoder rate controller, as claimed in claim 1, wherein the second transcoder means comprises a plurality of second transcoders, each second transcoder being arranged between corresponding respective third channel input/output ports and a fourth channel input/output port.

4. A transcoder rate controller, as claimed in claim 1, wherein the first transcoder means is adapted to transcode between A-channel data received or transmitted at the first channel input/output means and either A-ter or A-bis channel data received or transmitted at the second channel input/output means.

5. A transcoder rate controller, as claimed in claim 1, wherein the second transcoder means extracts TFO frames from data received on the plurality of channels at the third channel input/output means and combines said TFO frames to form the signal output at the fourth channel input/output means.

6. A transcoder rate controller as claimed in claim 1 wherein the first transcoder means transcodes data using a tandem free operation function (TFO).

7. A base station sub-system incorporating a transcoder rate controller as claimed in claim 1.

8. A data transmission network arrangement in which a mobile switching controller of the data transmission network is associated with a transcoder rate controller as claimed in claim 1, wherein an A-channel of the mobile switching controller is connected with the first channel input/output means of the transcoder rate controller and an E-channel of the mobile switching controller is connected to the third channel input/output means of the transcoder rate controller.

9. A transcoder rate controller comprising:
   a base station sub-system ("BSS") internal channel interface adapted to communicate with a plurality of BSS internal channels,
   an A-channel interface adapted to communicate with a single A-channel,
   a first transcoder coupled to the BSS internal channel interface and the A-channel interface,
   an E-Channel interface adapted to communicate with a mobile switching controller through a plurality of E-channels,
   an fourth Channel interface adapted to communicate with another transcoder through a fourth channel, wherein the fourth Channel is a channel for direct communication between transcoder rate controllers,
   a second transcoder coupled to the E-Channel interface and the fourth Channel interface, wherein the second transcoder is adapted to transcode received data using a tandem free operation ("TFO") function when the data contains TFO indicators.

10. The transcoder of claim 9 wherein the BSS internal channel is an A-bis channel.

11. The transcoder of claim 9 wherein the BSS internal channel is an A-ter channel.

12. The transcoder of claim 9 wherein the second transcoder is also adapted to transcode the received data without using trandem free operation when the data does not contain TFO indicators.

* * * * *